United States Patent [19]
Maas

[11] Patent Number: 4,834,044
[45] Date of Patent: May 30, 1989

[54] DEVICE FOR CONTROLLING THE DRIVE POWER OF A VEHICLE ENGINE FOR AUTOMOTIVE VEHICLES WITH TRACTION CONTROL

[75] Inventor: Joachim Maas, Darmstadt, Fed. Rep. of Germany

[73] Assignee: Alfred Teves, GmbH, Frankfurt am Main, Fed. Rep. of Germany

[21] Appl. No.: 18,700

[22] Filed: Feb. 25, 1987

[30] Foreign Application Priority Data

Mar. 15, 1986 [DE] Fed. Rep. of Germany ....... 3608791

[51] Int. Cl.$^4$ ............................................. B60K 26/04
[52] U.S. Cl. .................................... 123/342; 123/396; 123/401; 180/197
[58] Field of Search ....................... 123/342, 396, 401; 180/197

[56] References Cited

U.S. PATENT DOCUMENTS

| | | | |
|---|---|---|---|
| 3,952,827 | 4/1976 | Drutchas | 180/82 R |
| 4,077,370 | 3/1978 | Spangenberg | 123/401 X |
| 4,337,743 | 7/1982 | Mattson | 123/342 X |
| 4,485,781 | 12/1984 | Barnes | 123/342 |
| 4,712,634 | 12/1987 | Lindemann | 180/197 |

FOREIGN PATENT DOCUMENTS

| | | | |
|---|---|---|---|
| 2119248 | 11/1972 | Fed. Rep. of Germany. | |
| 3021116 | 12/1981 | Fed. Rep. of Germany. | |
| 3337664 | 5/1985 | Fed. Rep. of Germany | 180/197 |
| 59-05844 | 1/1984 | Japan | 123/401 |

Primary Examiner—Tony M. Argenbright
Assistant Examiner—Eric R. Carlberg
Attorney, Agent, or Firm—James B. Raden

[57] ABSTRACT

A device for controlling the engine drive power for automotive vehicles with traction control. A hydraulically actuatable control apparatus (1, 1') is inserted between the drive control pedal (7, 7') and the control member (10, 10') of the vehicle engine. The housing (2, 27) of the control apparatus (1, 1') is stationary and accommodates a piston (3, 30) which is axially slideably by the introduction of auxiliary pressure. The piston is coupled to the drive control pedal (7, 7'), on the one hand, and to the control member (10, 10'), on the other hand. A biased non-return valve (21, 45) which opens by a pedal-side tappet (18, 38) in the event of reduction of the pedal force (F) causes resetting of the control member (10, 10') when the pedal (7, 7') is released. An increase of the pedal force (F) during traction control will not result in a change in the position of the control member.

7 Claims, 1 Drawing Sheet

DEVICE FOR CONTROLLING THE DRIVE POWER OF A VEHICLE ENGINE FOR AUTOMOTIVE VEHICLES WITH TRACTION CONTROL

BACKGROUND OF THE INVENTION

The present invention relates to a device for automotive vehicles with traction control for controlling the drive power of a vehicle engine when control action takes place as a function of electric signals derived from the wheel rotational behavior. The device comprises a hydraulically actuatable control apparatus interposed into the path of force transmission from a drive control pedal, such as the accelerator pedal, to a control member of the vehicle engine. The control member can be the throttle-flap of an internal-combustion engine, the adjusting lever of a spark-ignition engine or the like. The control apparatus is connectable by way of multidirectional valves to an auxiliary-pressure source and to a pressure-compensating reservoir and a piston displaceable by the auxiliary pressure.

Devices of this type for traction slip control are known. These devices are combined with anti-lock systems because the brake system can also be used for controlling the traction slip for the purpose of traction control in an initial period prior to the intervention in the driving engine, i.e., prior to the reduction of the drive power. Further, component parts of the anti-lock system, for instance the wheel sensors, the electronic circuits for processing the signals as well as the auxiliary-energy supply system may likewise be employed for traction control.

German published patent application 30 21 116 describes a combined anti-lock and traction control system wherein a control apparatus is inserted into the linkage from the accelerator pedal to the throttle-flap of the vehicle engine for the purpose of traction control. In this case, the control apparatus is a drag link which contains a piston guided in a cylinder in opposition to the force of a compression spring and displaceable by the introduction of auxiliary pressure. The throttle-flap is opened by pressure by way of a linkage in which the drag link is interposed. In the presence of excessive traction slip, auxiliary pressure is hydraulically introduced, thereby the length of the drag link and thus the entire length of the linkage is reduced. As a result, resetting of the throttle-flap and hence a reduction of the drive power of the vehicle engine is accomplished. It is a disadvantage, among others, that the resetting of the throttle-flap can be cancelled at least partially by further depression of the accelerator pedal.

Another known device for the slip limitation during traction is equipped with an adjustable stop for the accelerator pedal (German published patent application 33 37 664). In this event, a piston guided in a cylinder is also used as control apparatus, which piston limits the depression of the accelerator pedal and resets the pedal, respectively, by the introduction of pressure. A bellows serves as an adjustable pedal stop into which hydraulic oil can be introduced in the event of excessive traction slip. It is a shortcoming that the resetting force is transmitted in a full extent onto the accelerator pedal, annoying to the driver when quick-responding systems are used. Instead of the hydraulically actuatable devices, it is also possible to use an electric motor as control apparatus.

It is the object of the present invention to overcome the described disadvantages of the known devices and to provide a device for controlling the drive power of a vehicle engine, wherein the reaction of the control on the pedal is at least largely damped and which, on commencement of the control, will not react on further depression of the pedal. Moreover, the throttle-flap or the control member is instantaneously reset in the event of release of the accelerator pedal or reduction of the actuating force applied on the accelerator pedal.

SUMMARY OF THE INVENTION

This object is achieved in accordance with the present invention by a device of the type referred to with the improvement thereof wherein the piston of the control apparatus is arranged in a stationary housing and both end faces of the piston confine working chambers. The piston is connected by way of one or more springs with the drive control pedal, on the one hand, and is connected to the control member of the vehicle engine, on the other hand. Further, the piston is displaceable by the drive control pedal. In the inactive position the two chambers at the end faces of the piston communicate by way of the multidirectional valves with the pressure-compensating reservoir. A biased non-return valve is provided intermediate the chambers at the both end faces of the piston. The valve is opened by a tappet arranged close to the pedal in the inactive position of the control apparatus and when the pedal is released, that is when the actuating force applied on the pedal is reduced.

The device in accordance with the present invention permits exact regulation of traction slip by virtue of the controlled delivery of pressure into the working chamber which results in the resetting of the engine throttle-flap. A release of the accelerator pedal is immediately followed by the resetting of the control member under all conditions, and in particular, in every pedal position. The reaction of the control on the accelerator pedal is damped to such extent that the reaction of the pedal will not be sensed by the driver as abrupt, even in the event of rapid pressure fluctuations and a large resetting force. On the other hand, however, the commencement of control is signalled to the driver through the pedal.

According to one embodiment of the present invention, a tensile force is transmitted onto the piston and onto the control member when the drive control pedal is actuated. The pedal can be coupled with the piston by way of a resetting spring.

According to another embodiment, in the inactive position of the inventive device, the tappet abuts on the valve member of the non-return valve and keeps the valve open, while, on actuation of the drive control pedal in opposition to the force of a second weak resetting spring, first a defined lost travel is overcome which causes the tappet to lift away from the valve member.

The multidirectional valves can be provided in the form of two two-way/two-position directional control valves which serve to control the piston displacement. One of the two valves is opened in the inactive position, whereby both chambers at the end faces of the piston are in communication with the pressure-compensating reservoir. The second valve is closed in the inactive position which serves to meter auxiliary pressure into the pedal side working chamber of the piston for the purpose of reduction of the drive power.

Another embodiment of the instant invention provides that the pedal-actuating force is transmittable by way of a pull rod onto the tappet and by way of compression springs onto the piston. A weak compression spring is provided which defines the lost travel which is covered on pedal actuation and which results in lifting of the tappet away from the valve member.

BRIEF DESCRIPTION OF THE DRAWINGS

Further features, advantages and applications of the present ainvention can be gathered from the following description taken in conjunction with the accompanying drawing wherein.

DETAILED DESCRIPTION

Figure 1:
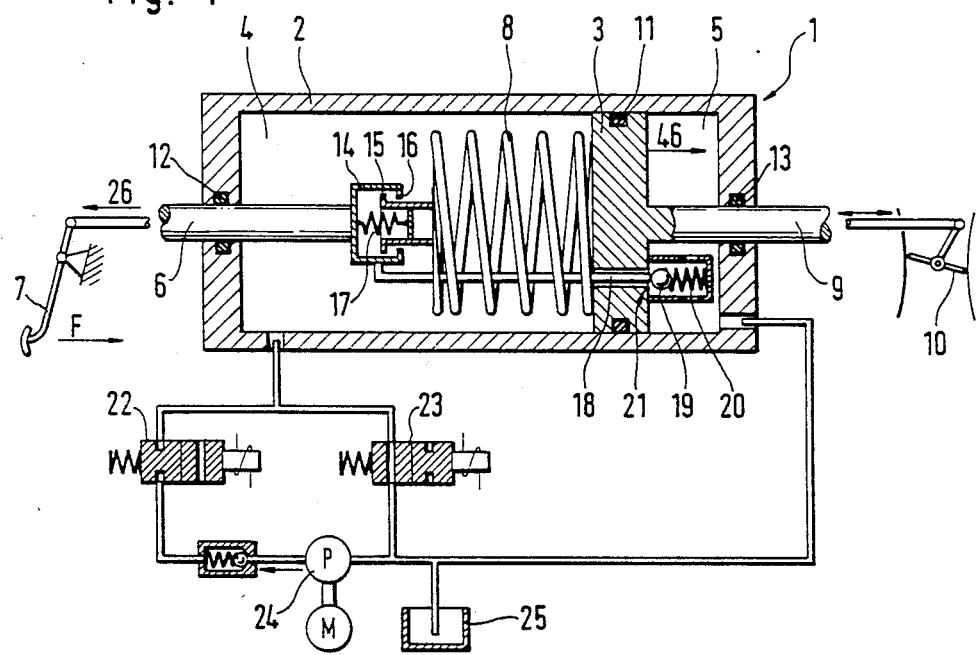
FIG. 1 is a schematic simplified view of the longitudinal cross-section taken through a control member of the present invention in a symbolic representation the pertinent multidirectional control valves and other component parts necessary for the control of the engine drive power; and, FIG. 2 is a schematic and simplified partial view of an alternative embodiment of the present invention.

The principal design as well as the mode of function of a device of the present invention is illustrated in FIG. 1. Serving as a control apparatus 1 in this embodiment is a piston 3 which is axially slideably guided in a cylinder-shaped housing 2, the two end faces of piston 3 confining working chambers 4, 5. On actuation of an accelerator pedal 7, a tensile force is transmitted by way of a pull rod 6 through a spring 8 onto the piston 3 and from the piston onto another pull rod 9 and onto the control member 10 of a vehicle engine. Linkages or Bowden cables can be inserted between the pedal 7 and the pull rod 6, on the one hand, and between the throttle-flap 10 and the pull rod 9. As is indicated symbolically, the housing is fixedly mounted to the vehicle, in contrast to the known draglink described hereinabove.

Circumferential seals 11, 12, 13 serve to seal the piston in the cylinder-shaped housing 5 and the pull rods 6, 9 in the apertures through the end walls of the control apparatus because pressure fluid is metered into this chamber. Between the pedal-side pull rod 6 and the spring 8, an arrangement 14 is provided for predetermination of a specific lost travel limited by stops 15, 16 which, after the lost travel in the direction of pull has been overcome, cause a rigid coupling between the pull rod 6 and the spring 8. A weal resetting spring 17 ensures that the individual components assume the illustrated position after the pedal is released. Secured to the arrangement 14 is a tappet 18 which, in the inactive position of the control apparatus 1, bears against a valve member 19 of a non-return valve 21 biased by a spring 20 and keeps the valve open. The bias caused by the spring 20 is sized such that the non-return valve can only be opened by the tappet 18, but not by the pressure in the chamber 4.

To control the control apparatus 1, the embodiment according to FIG. 1 provides electromagnetically actuatable multidirectional control valves 22, 23. The auxiliary pressure necessary for the control and regulation is generated by an electromotively driven pressure-fluid pump 24, the suction side of which terminates into a pressure-compensating reservoir 25. Prior to the commencement of traction control, the passage through the valve 22 is closed, while the valve 23 establishes communication between the pedal-side chamber 4 of the control apparatus 1 and the pressure-compensating reservoir 25 in the inactive position shown. The second chamber 5 of the control apparatus 1 is in permanent communication with the reservoir 25.

The illustrated device operates as follows: When the accelerator pedal 7 is actuated by the pedal force F, a tensile force is transmitted in the direction of the arrow 26 onto the pull rod 6. At first, the lost travel between the two stops 15, 16 is overcome. As a result, the tappet 18 lifts away from the valve member 19, and the valve 21 closes. Subsequently, the tensile force is transmitted by way of the spring 8 onto the piston 3 and from the piston 3 by way of the pull rod 9 onto the control member 10.

When traction slip becomes excessive, traction control sets in. The two-way/two-position directional control valve 23 interrupts the connection between the working chamber 4 and the reservoir 25. A short-time switch-over of the two-way/two-position directional control valve 22 causes controlled delivery of pressure fluid into the working chamber 4, which results in displacement of the piston 3 in the direction of the arrow 46. Thereby, the throttle-flap 10 is reset by a predefined amount and, as a result thereof, the drive power of the vehicle engine is reduced. Owing to the short-time switching back of the two-way/two-position directional control valve 23 into the opened position illustrated (the timing of switch-over and the duration of switch-over are determined bhy the non-illustrated electronic control system in dependence on the rotational behavior of the driven wheels) the pressure in the working chamber 4 is again reduced in case of need, and the engine power is thereby increased.

When the driver increases the pedal force, that is the force F acting on the pedal 7, during a control action, this action has no influence on the position of the control member 10 since the piston 3 is maintained in the position predetermined by the control due to the pressure fluid metered through the valve 22. However, when the driver removes his foot from the accelerator pedal 7 at any point in time, the tappet 18 causes the non-return valve 21 to open, whereby a pressure-fluid conduit to the reservoir 25 is opened and a pressure balance is achieved. The throttle-flap which herein serves as control member 10 is reset in the direction of attaining less engine power.

Figure 2:
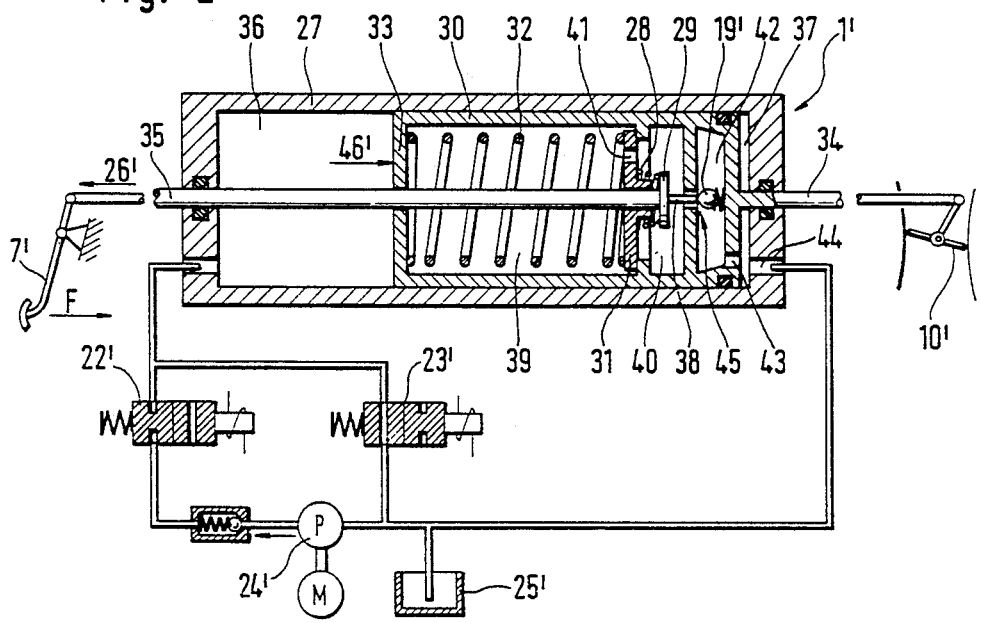

FIG. 2 illustrates an alternative embodiment which is similar in principle, but which differs in construction. Upon actuation of the accelerator pedal 7, a tensile force is again transmitted in the direction of the arrow 26' onto a pull rod 35 which is axially slideably guided in a stationary housing 27 of the control apparatus 1'. After a lost travel has been overcome in opposition to the force of a weak compression spring 28, a flange 29 rigidly coupled to the pull rod moves into abutment on the annular flange of an axially slideable disc 31 which is arranged in the interior of a piston 30. By way of a compression spring 32, the tensile force exerted by the pedal 7' is transmitted onto the radial flange 33 of the piston 30. This causes the piston to displace to the left, as viewed in the illustration according to FIG. 2. By virtue of the pull rod 34 rigidly coupled to the piston 30, the tensile force is supplied from the piston 30, the tensile force is supplied from the piston 30 onto the control member 10' in a manner similar to the embodiment according to FIG. 1.

The control apparatus 1', in turn, comprises a pedal-side working chamber 36 and a second working chamber 37 confined by the second end face of the piston 30. A biased non-return valve 45 provides the same function as the valve 21 in FIG. 1. The controlling and regulating arrangement, namely the multidirectional control valves 22', 23', a pump 24' serving as an auxiliary-pressure source and a pressure-compensating reservoir 25' operate in a manner similar to that of the corresponding component parts according to FIG. 1. These elements are connected hydraulically in the same fashion.

For traction control, pressure is introduced into the working chamber 36 which resets the piston in the direction of the arrow 46' in the direction of its inactive position and which reduces the engine drive power by virtue of the throttle-flap 10'. The head end of the pull rod 35 simultaneously serves as a valve tappet 38 which, similar to the tappet 18 in FIG. 1, acts on the non-return valve 45 as soon as the accelerator pedal 7' is relieved from load or released.

The chambers 39 and 40 in the interior of the piston 30 are interconnected by way of a bore 41 in the disc 31 so that the same amount of pressure always prevails in these two chambers. In contrast thereto, a third chamber 42 in the interior of the piston 30 is in communication by way of a passage 43 with the chamber 37 and via an outlet 44 in communication with the pressure-compensating reservoir 25'. The control apparatus 1' described in FIG. 2 is further characterized by relatively easy manufacture and by a compact design.

What is claimed: -

1. A device for automotive vehicles with traction control for controlling the drive power of a vehicle engine when control action takes place as a function of electric signals derived from the wheel rotational behavior, comprising a hydraulically actuatable control apparatus interposed into the path of force transmission from a drive control pedal to a control member of the vehicle engine, the control member being one of the throttle-flap of an internal-combustion engine, and the like, said control apparatus being connectable by way of multidirectional valves to an auxiliary-pressure source and to a pressure-compensating reservoir, and including a piston displaceable by the auxiliary pressure, wherein the piston (3, 30) of the control apparatus 1, 1') is arranged in a stationary housing (2, 27), both end faces of said piston confining working chambers (4, 5, 37, 39), wherein the piston (3, 30) is connected by way of one or more springs (8, 17, 28, 32) with the drive control pedal (7, 7') and with the control member (10, 10') of the vehicle engine, and is displaceable by the drive control pedal (7, 7'), wherein in the inactive position of the control apparatus (1, 1') the two chambers (4, 5, 36, 37) at the end faces of the piston (3, 30) communicate by way of the multidirectional valves (22, 22', 23, 23') with the pressure-compensating reservoir (25, 25'), a biased non-return valve (21, 45) intermediate the chambers (4, 5, 36, 37) at the two end faces of the piston (3, 30), said valve being opened by a tappet (18, 38) arranged close to the pedal in the inactive position of the control apparatus (1, 1') and when the actuating force on the drive control pedal (7, 7') is reduced.

2. A device as claimed in claim 1, wherein on actuation of the drive control pedal (7, 7') a tensile force is transmittable onto the piston (3, 30) and onto the control member (10, 10') of the driving engine.

3. A device as claimed in claim 2, wherein the drive control pedal (7, 7') is coupled to the piston (3, 30) by way of a resetting spring (8, 32).

4. A device as claimed in claim 3, wherein in the inactive position of the control apparatus (1, 1'), the tappet (18, 38) abuts on the valve member (19, 19') of the non-return valve (21, 45), and wherein on actuation of the drive control pedal (7, 7') in opposition to the force of a second resetting spring (17, 28), a defined lost travel is performed which causes the tappet (18, 38) to lift away from the valve member (19, 19').

5. A device as claimed in claim 4, wherein two two-way/two-position directional control valves (22, 22', 23, 23') are provided which serve to control the piston displacement.

6. A device as claimed in claim 5, wherein a first two-way/two-position directional control valve (23, 23') is opened in the inactive position and provides communication between both chambers (4, 5, 36, 37) at the end faces of the piston (3, 30) and the pressure-compensating reservoir (25, 25') while a second two-way/two-position directional control valve (22, 22') which is closed in its inactive position serves to meter auxiliary pressure into the pedal-side working chamber (4, 36) of the piston (3, 30) for the purpose of reducing the drive power.

7. A device as claimed in claim 6, wherein the pedal-actuating force is transmittable by way of a pull rod (6, 35) onto the tappet (18, 38) and by way of compression springs (8, 32) onto the piston (3, 30).

* * * * *